(12) United States Patent
Nishiwaki et al.

(10) Patent No.: US 7,911,926 B2
(45) Date of Patent: Mar. 22, 2011

(54) OPTICAL DISC DRIVE (75) Inventors: Seiji Nishiwaki, Hyogo (JP); Kazuo Momoo, Osaka (JP)

(73) Assignee: Panasonic Corporation, Osaka (JP)

(*) Notice: Subject to any disclaimer, the term of this patent is extended or adjusted under 35 U.S.C. 154(b) by 491 days.

(21) Appl. No.: 12/090,268

(22) PCT Filed: Sep. 19, 2006

(86) PCT No.: PCT/JP2006/318516
§ 371 (c)(1),
(2), (4) Date: Apr. 15, 2008

(87) PCT Pub. No.: WO2007/046207
PCT Pub. Date: Apr. 26, 2007

(65) Prior Publication Data
US 2009/0238051 A1 Sep. 24, 2009

(30) Foreign Application Priority Data
Oct. 18, 2005 (JP) .................................. 2005-302889

(51) Int. Cl.
*G11B 7/00* (2006.01)
(52) U.S. Cl. ...................................... 369/118; 369/47.14
(58) Field of Classification Search .................. None
See application file for complete search history.

(56) References Cited

U.S. PATENT DOCUMENTS

| 5,535,179 A | | 7/1996 | Noguchi | |
|---|---|---|---|---|
| 5,621,717 A | * | 4/1997 | Finkelstein et al. | 369/112.16 |
| 5,787,061 A | * | 7/1998 | Tsuchiya et al. | 369/44.29 |
| 6,628,464 B1 | * | 9/2003 | Johnson | 359/894 |
| 7,345,754 B1 | * | 3/2008 | Zhao et al. | 356/237.5 |
| 2002/0009023 A1 | * | 1/2002 | Nishiwaki et al. | 369/44.23 |

FOREIGN PATENT DOCUMENTS

| JP | 63-193334 | 8/1988 |
|---|---|---|
| JP | 07-105587 | 4/1995 |
| JP | 09-223321 | 8/1997 |

OTHER PUBLICATIONS

International Search Report for corresponding Application No. PCT/JP2006/318516 dated Oct. 17, 2006.

* cited by examiner

*Primary Examiner* — Joseph Haley
*Assistant Examiner* — Ifedayo Iluyomade
(74) *Attorney, Agent, or Firm* — Renner, Otto, Boiselle & Sklar, LLP (57) ABSTRACT A tracking error signal is generated with stability without being easily affected by a distribution fluctuation of light reflected from an optical disc or by a lens shift.

An optical disc drive according to the present invention includes: an objective lens 5 with an aperture radius r0 for converging a light beam emitted from a light source 1; a polarizing hologram substrate 2 for dividing the beam reflected from the optical disc 6 into branched light beams; a photodetector substrate 6, on which at least some of the light beams are incident to generate signals representing the intensities of the light beams; and a shielding mask 16 for cutting off the beam partially. If xy coordinates are defined on a virtual plane, passing the center of the lens 5 and intersecting with the optical axis 7 at right angles, such that an x-axis is parallel to the disc radial direction and a y-axis crosses the x-axis at right angles, the shielding mask 16 prevents the beam from passing through areas of the virtual plane defined by coordinates (x, y) satisfying $|x|>a$, $|y|>b$ and $a^2+b^2<r0^2$ (where a and b are positive real numbers).

11 Claims, 5 Drawing Sheets

OPTICAL DISC DRIVE

TECHNICAL FIELD

The present invention relates to an optical disc drive for reading and/or writing data from/on an optical disc.

BACKGROUND ART

An example of a conventional optical disc drive will be described with reference to FIGS. 5 to 8. Such an optical disc drive is disclosed in Patent Document No. 1, for example.

Figure 5:
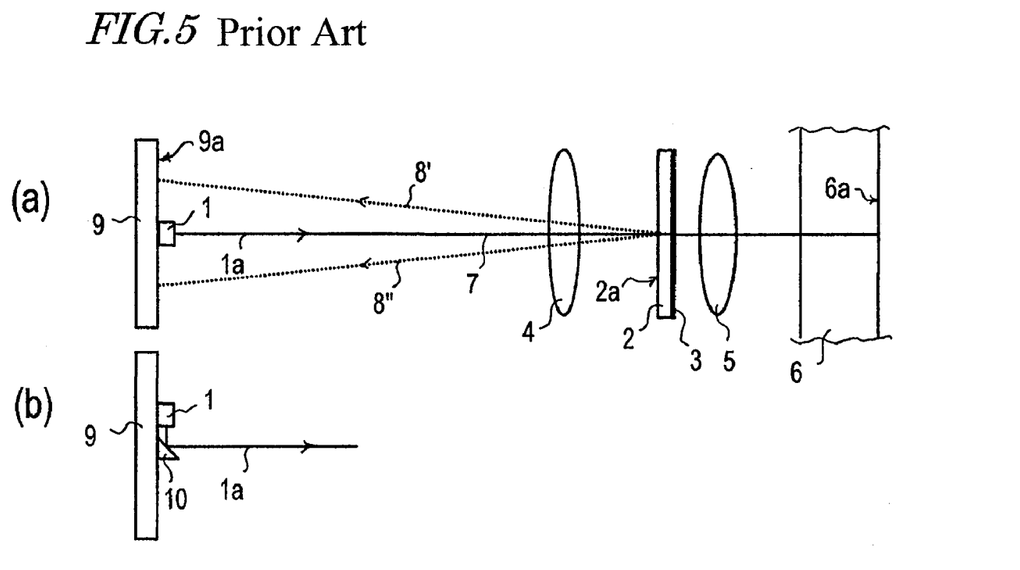
FIG. 5(a) is a cross-sectional view showing the configuration of a conventional optical disc drive and FIG. 5(b) shows one side of its light source and surrounding members, which side crosses the paper of FIG. 5(a) at right angles.
Figure 6:
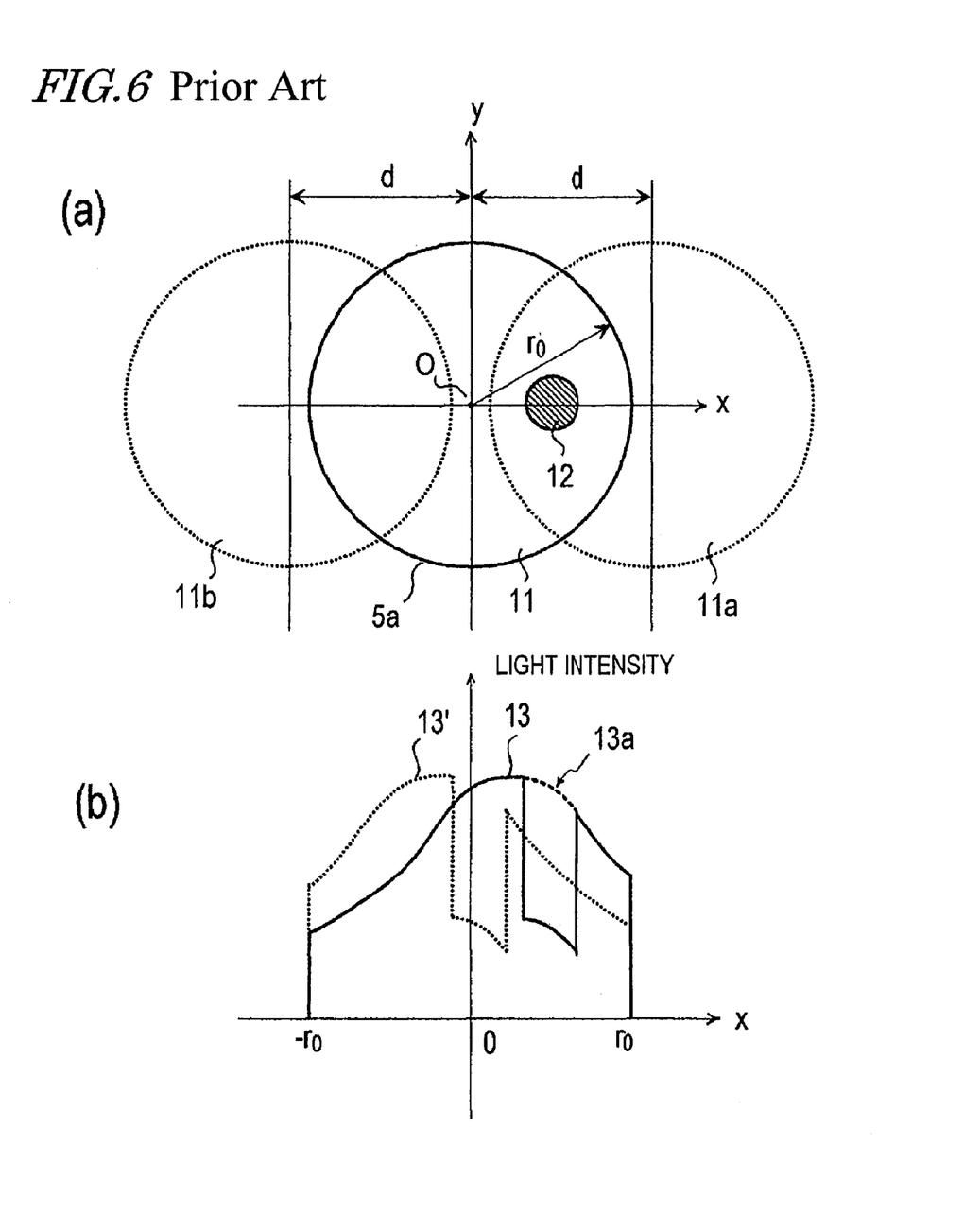
FIG. 6(a) shows the distribution of reflected light just before the light reaches the hologram plane 2a in the optical disc drive.
FIG. 6(b) shows the distribution of light intensity on a cross section that is defined in the disc radial direction and that corresponds to distribution of the reflected light shown in FIG. 6(a).

First, look at FIG. 5. FIG. 5(a) is a cross-sectional view showing the configuration of a conventional optical disc drive and FIG. 5(b) shows one side of its light source and surrounding members. The side crosses the paper of FIG. 5(a) at right angles.

In the conventional optical disc drive shown in FIGS. 5(a) and 5(b), a laser beam 1a that has been emitted with a wavelength λ from a light source 1 such as a semiconductor laser diode, which is mounted on a photodetector substrate 9, is reflected by a reflective mirror 10, which is also arranged on the photodetector substrate 9, and then transformed by a collimator lens 4 into a parallel beam, of which the optical axis is defined by the line 7.

The parallel beam, of which the optical axis is defined by the line 7, is transmitted through a polarizing hologram substrate 2 and then transformed by a quarter-wave plate 3 from a linearly polarized light beam (which is either an S-wave or a P-wave) into an elliptically polarized light beam. Thereafter, the elliptically polarized light beam is condensed by an objective lens 5 with a focal length f to be converged on a signal plane 6a of an optical disc 6.

The light that has been reflected from the signal plane 6a is passed through the objective lens 5 and then transformed by the quarter-wave plate 3 into a linearly polarized light beam (which is either a P-wave or an S-wave) again. This linearly polarized light beam is then incident on the hologram plane 2a of the polarizing hologram substrate 2, diffracted, and then branched into first-order diffracted light 8' and −first-order diffracted light 8", which are symmetric to each other with respect to the optical axis 7 as the axis of symmetry. The branched light (diffracted light) beams are converged through the collimator lens 4 and then incident on the detector plane 9a of the photodetector substrate 9. The quarter-wave plate 3 is arranged on the polarizing hologram substrate 2 and moves synchronously with the objective lens 5.

The detector plane 9a is located substantially on the focal plane of the collimator lens 4 (i.e., at the virtual emission point of the light source 1). On the signal plane 6a of the optical disc 6, either guide grooves or pit sequences are arranged at a pitch Λ in the disc radial direction so as to run in the disc rotating direction.

In the space between the light source 1 and the collimator lens 4, the optical axis 7 is aligned with the center axis of the collimator lens 4 and the extension thereof. On the other hand, in the space between the collimator lens 4 and the signal plane 6a of the optical disc 6, the optical axis 7 is aligned with the center axis of the objective lens 5 and the extension thereof.

FIG. 6(a) shows the distribution of light on a plane that intersects with the optical axis 7 of the reflected light at right angles just before the reflected light reaches the hologram plane 2a in the optical disc drive described above. On the other hand, FIG. 6(b) shows the distribution of light intensity on a cross section that is defined in the disc radial direction and that corresponds to distribution of the reflected light shown in FIG. 6(a).

The x- and y-axes shown in FIG. 6(a) correspond to the disc radial direction and the rotating direction, respectively. The optical axis 7 passes the intersection O between the x- and y-axes.

In FIG. 6(a), when reflected from the signal plane 6a of the optical disc, the light beam is diffracted by the periodic structure with the pitch Λ on the signal plane 6a of the optical disc. In the reflected light that is about to enter the hologram plane 2a, zero-order diffracted light 11 partially overlaps with not only first-order diffracted light 11a but also −first-order diffracted light 11b.

Each of diffracted light beams has its center shifted by a distance d in the disc radial direction (i.e., in the x-axis direction) and has a light distribution in which a portion of the light outside of the aperture 5a of the objective lens 5 is cut off in the area with a radius r that is greater than r0, where r0 is the aperture radius of the objective lens 5. However, the first-order diffracted light 11a has shifted in the positive direction along the x-axis, while the −first-order diffracted light 11b has shifted in the negative direction along the x-axis. And the magnitude d of shift may be given by the following Equation (1), where λ is the wavelength of the light emitted from the light source 1, f is the focal length of the objective lens 5 and is equal to r0/NA (where NA is the numerical aperture of the objective lens 5) and Λ is the pitch of the periodic structure on the signal plane 6a of the optical disc 6.

$$d = f\lambda/\Lambda \tag{1}$$

The phase relation between the intensities of the zero-order diffracted light and the ±first-order diffracted light is determined by the shape parameters (including the pitch, groove width and groove depth) of the guide grooves on the signal plane 6a and the location of the light beam spot with respect to the guide grooves (including the magnitude of off-track with respect to the center of the guide grooves and the magnitude of defocusing). The distribution of the reflected light, produced as a result of the mutual overlap and interference of these light beams, is also determined by the shape parameters of the guide grooves, the magnitude of off-track and the magnitude of defocusing.

The intensity distribution of the laser beam 1a emitted from the light source 1 is usually a Gaussian distribution and is adjusted such that when the objective lens 5 is located at its reference position, the center of the light intensity distribution is located at x=y=0 on the way toward the disc. The zero-order diffracted component of the reflected light has a distribution obtained by inverting that Gaussian distribution with respect to the optical axis. Also, when the magnitude of off-track is zero, the light distribution of the reflected light, produced by the overlap of diffracted light beams, often has a quasi-Gaussian distribution, too. Actually, however, there will be some adjustment errors and other errors, and therefore, the reflected light has an intensity distribution that is asymmetric with respect to the origin. And the curve 13 shown in FIG. 6(b) is drawn on that model. Furthermore, the real Gaussian distribution has such significant fluctuations that the light intensity may be rather low (or high) in some areas. The distribution of the reflected light may also fluctuate due to the presence of dust that has been deposited on the surface of a lens or the disc base member. The area 12 shown in FIG. 6(a) represents such a fluctuation and functions as an area with a lower intensity than its surrounding areas as represented by the curve 13a in FIG. 6(b). Also, if the objective lens 5 shifted in the radial direction of the optical disc while a tracking control is being performed on the optical disc, the light intensity distribution of the reflected light would be represented by the curve 13' that has shifted in the opposite direction.

Figure 7:
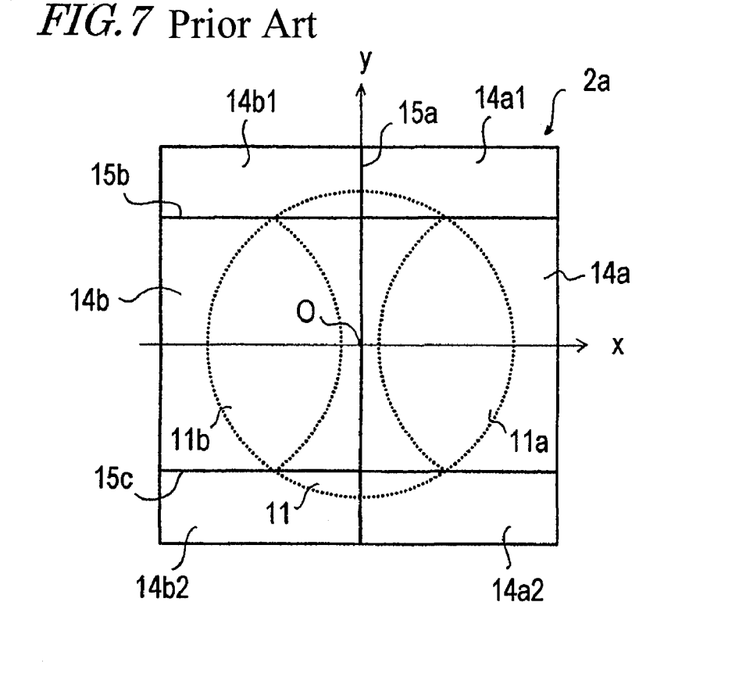
FIG. 7 shows how the light beam spot is divided on a hologram plane 2a in a first example of the prior art.

FIG. 7 shows how the light beam spot is divided on the hologram plane 2a. The hologram plane 2a does not necessarily have to intersect with the optical axis 7 at right angles but is supposed to do that in the following description. The x- and y-axes correspond to the disc radial direction and rotating direction, respectively, and the optical axis 7 passes the intersection O between these two axes.

As shown in FIG. 7, the hologram plane 2a is divided by division lines 15a, 15b and 15c into six areas 14a, 14a1, 14a2, 14b, 14b1 and 14b2. A portion of the light that has been reflected from the signal plane 6a of the optical disc and then incident on the hologram plane 2a is branched by these areas, thereby producing branched light beams. And the intensities of the branched light will be detected independently of each other by the photodetectors on the detection plane 9a. The intensities of those light beams detected will be identified by S14a, S14a1, S14a2, S14b, S14b1 and S14b2, respectively.

The division line 15a equally splits the zero-order diffracted light 11 into two in the disc rotating direction (i.e., along the y-axis), while the division lines 15b and 15c divide portions of the zero-order diffracted light 11 near the outer periphery in the disc radial direction (i.e., along the x-axis) so as to choose portions that are not overlapped by the ±first-order diffracted light 11a and 11b. The following two signals can be figured out based on the detection signals of the photodetectors.

$$TE1 = S14a - S14b \quad (2)$$

$$TE2 = S14a1 + S14a2 - (S14b1 + S14b2) \quad (3)$$

The tracking error signal TE, representing the magnitude of error with respect to the guide groove (or pit sequence) on the signal plane 6a of the optical disc 6, may be calculated, using a coefficient value k, by the following Equation (4).

$$TE = TE1 - k \times TE2 \quad (4)$$

While the tracking control is performed on the guide grooves, the objective lens 5 shifts in the radial direction synchronously with the in-plane vibrations of the optical disc. As a result, the intensity distribution of the reflected light also shifts from that represented by the curve 13 to that represented by the curve 13' as shown in FIG. 6(a). And TE1 and TE2 are also affected.

Generally speaking, the off-track of a light beam spot with respect to the guide grooves changes information about the phase relation between the zero-order diffracted light and the ±first-order diffracted light. That is why in an area where these diffracted light beams interfere with each other, the light intensity varies. Equation (2) covers the area where the zero-order diffracted light and the ±first-order diffracted light interfere with each other, while Equation (3) covers only the area with the zero-order diffracted light. For that reason, information about the off-track is included in TE1 but not in TE2. That is to say, only information about a lens shift is included in TE2. Consequently, if the coefficient value k is selected appropriately, a tracking error signal that is not affected by any lens shift can be generated by Equation (4).

Figure 8:
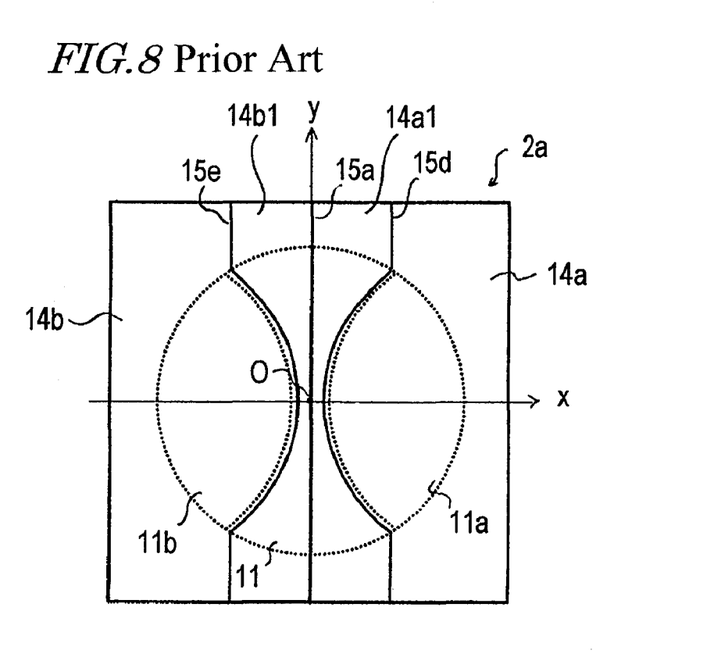
FIG. 8 shows how the light beam spot is divided on a hologram plane 2a in a second example of the prior art.

FIG. 8 shows how the light beam spot may be divided on the hologram plane 2a in another conventional drive.

In this example, the x- and y-axes also correspond to the disc radial direction and rotating direction, respectively, and the optical axis 7 also passes the intersection O between these two axes. The hologram plane 2a is divided by division lines 15a, 15d and 15e into four areas 14a, 14a1, 14b and 14b1. A portion of the reflected light that has been incident on the hologram plane 2a is branched by these areas, and the intensities of the resultant branched light beams will be detected independently of each other by the photodetectors on the detection plane 9a. The intensities of those light beams detected will be identified by S14a, S14a1, S14b and S14b1, respectively. The division line 15a equally splits the zero-order diffracted light 11 into two in the disc rotating direction (i.e., along the y-axis), while the division lines 15d and 15e divide portions of the zero-order diffracted light 11 near the y-axis along the outer edge of the ±first-order diffracted light 11a and 11b so as to choose portions that are not overlapped by the ±first-order diffracted light 11a and 11b.

The following two signals TE1 and TE2 can be calculated by Equation (2) and the following Equation (5) based on the detection signals of the photodetectors.

$$TE2 = S14a1 - S14b1 \quad (5)$$

The tracking error signal TE, representing the magnitude of error with respect to the guide groove (or pit sequence) on the signal plane 6a of the optical disc 6, may be calculated by Equation (4) using the coefficient value k. TE1 is also affected by a lens shift and an off-track as in the example shown in FIG. 7 but TE2 is affected only by a lens shift because it represents the area with only the zero-order diffracted light. That is why by selecting an appropriate coefficient value k, a tracking error signal that will not be affected by any lens shift can be figured out by Equation (4).

Patent Document No. 1: Japanese Patent Application Laid-Open Publication No. 9-223321

DISCLOSURE OF INVENTION

Problems to be Solved by the Invention

The conventional optical disc drives described above, however, have the following drawbacks.

Specifically, in the example of the prior art shown in FIG. 7, portions of the reflected light beam spot in the areas 14a1, 14a2, 14b1 and 14b2 that contribute to detecting TE2 are much smaller (e.g., about 1/20 to about 1/30) in cross section than portions of the reflected light beam spot in the areas 14a and 14b that contribute to detecting TE1. Consequently, the signal level of TE2 is much lower than that of TE1 and the coefficient value k in Equation (4) becomes very large (e.g., about 20 to about 30). In that case, even a very small disturbance (such as the influence of a fluctuation in the distribution of the reflected light) that affects the signal TE2 will be amplified by the coefficient value k. That is to say, the TE signal calculated by Equation (4) will be varied significantly by the disturbance signal.

On the other hand, in the example of the prior art shown in FIG. 8, the portions of the reflected light beam spot have an increased cross section in the areas 14a1 and 14b1 contributing to detecting TE2, and therefore, the coefficient value k in Equation (4) can be a small value of about 5 to about 10, for example. However, if the light intensity distribution of the reflected light varies due to a lens shift (e.g., a variation from the curve 13 into the curve 13') as shown in FIG. 6(b), the distribution fluctuation area 12 may overlap with one of the areas 14a1 and 14a2 contributing to detecting TE2 along the x-axis. As a result, TE2 is likely to be subject to a significant disturbance.

Furthermore, due to a variation in the pitch Λ of the periodic structure on the signal plane 6a of the optical disc 6, the center of the ±first-order diffracted light also varies to a certain degree along the x-axis. As a result, the outer edges of the ±first-order diffracted light 11a and 11b may sometimes overlap with the division lines 15d and 15e. In that case, information about an off-track will be included in TE2, too, and the amplitude (detection sensitivity) about a tracking error represented by the TE signal given by Equation (4) will attenuate steeply. Consequently, both of these two examples of the prior art may be significantly affected by the fluctuation in the intensity distribution of the reflected light or may have a steeply attenuated TE signal output. That is why it has been difficult in the prior art to generate a tracking error signal with stability without being affected by a lens shift.

In order to overcome the problems described above, the present invention has an object of providing an optical disc drive that can generate a tracking error signal with stability without being easily affected by any fluctuation in the intensity distribution of the reflected light or by a lens shift.

Means for Solving the Problems

An optical disc drive according to the present invention is designed to read and/or write data from/on an optical disc. The drive includes: a light source for emitting a light beam; an objective lens for converging the light beam, the lens having an aperture radius r0; an optical branching element for dividing the light beam that has been reflected from the optical disc into multiple branched light beams; a photodetector, on which at least some of the branched light beams are incident and which generates signals representing the intensities of the respective incident branched light beams; and opaque portions for cutting off the light beam partially. If xy coordinates are defined on a virtual plane, which intersects with the center axis of the objective lens at right angles, such that an x-axis is parallel to a radial direction of the optical disc and that a y-axis crosses the x-axis at right angles, the opaque portions prevent the light beam from passing through areas of the virtual plane that are defined by coordinates (x, y) satisfying $|x|>a$, $|y|>b$ and $a^2+b^2<r0^2$ (where a and b are positive real numbers).

In one preferred embodiment, the positive real number a satisfies the inequality $Λ/2λ-0.04<a/f<Λ/2λ$, where $λ$ is the wavelength of the light beam that has been emitted from the light source, f is the focal length of the objective lens and $Λ$ is a pitch of a guide groove and a pit sequence of the optical disc.

In another preferred embodiment, the optical branching element branches the light beam into a light beam that is going to enter an area of the virtual plane where y>b and x>0 are satisfied and a light beam that is going to enter another area of the virtual plane where y>b and x<0 are satisfied, and uses a signal representing a difference in light intensity between these two light beams that have been incident on the respective areas to correct a tracking error signal.

In still another preferred embodiment, the optical branching element branches the light beam into a light beam that is going to enter an area of the virtual plane where y<-b and x>0 are satisfied and a light that is going to enter another area of the virtual plane where y<-b and x<0 are satisfied, and uses a signal representing a difference in light intensity between these two light beams that have been incident on the respective areas to correct a tracking error signal.

In yet another preferred embodiment, the optical branching element branches the light beam into a light beam that is going to enter an area of the virtual plane where $|y|<b$ and x>0 are satisfied and a light beam that is going to enter another area of the virtual plane where $|y|<b$ and x<0 are satisfied. Supposing a signal representing a difference in light intensity between these two light beams that have been incident on the respective areas is TE1 and a signal representing a difference in light intensity between two light beams that have been incident on an area where y>b and x>0 are satisfied and on an area where y>b and x<0 are satisfied, respectively, is TE2, a tracking error signal, given by the equation TE1−k×TE2 (where k is a constant), is generated.

In yet another preferred embodiment, the optical branching element branches the light beam into a light beam that is going to enter an area of the virtual plane where $|y|<b$ and x>0 are satisfied and a light beam that is going to enter another area of the virtual plane where $|y|<b$ and x<0 are satisfied. Supposing a signal representing a difference in light intensity between these two light beams that have been incident on the respective areas is TE1 and a signal representing a difference in light intensity between two light beams that have been incident on an area where y<−b and x>0 are satisfied and on an area where y<−b and x<0 are satisfied, respectively, is TE2, a tracking error signal, given by the equation TE1−k×TE2 (where k is a constant), is generated.

In yet another preferred embodiment, the optical branching element branches the light beam into a light beam that is going to enter an area of the virtual plane where $|y|>b$ and x>0 are satisfied and a light beam that is going to enter another area of the virtual plane where $|Y|>b$ and x<0 are satisfied, and uses a signal representing a difference in light intensity between these two light beams that have been incident on the respective areas to correct a tracking error signal.

In yet another preferred embodiment, the optical branching element branches the light beam into a light beam that is going to enter an area of the virtual plane where $|y|b$ and x>0 are satisfied and a light beam that is going to enter another area of the virtual plane where $|y|<b$ and x<0 are satisfied. Supposing a signal representing a difference in light intensity between these two light beams that have been incident on the respective areas is TE1 and a signal representing a difference in light intensity between two light beams that have been incident on an area where $|y|>b$ and x>0 are satisfied and on an area where $|y|>b$ and x<0 are satisfied, respectively, is TE2, a tracking error signal, given by the equation TE1−k×TE2 (where k is a constant), is generated.

EFFECTS OF THE INVENTION

According to the present invention, the beam spot is divided by division lines that are drawn in the direction in which the lens shifts, and the area that is not overlapped by the ±first-order diffracted light can be broadened. As a result, the tracking error signal can be generated with stability without being easily affected by a fluctuation in the intensity distribution of the reflected light or a lens shift. In addition, even if the pitch of the guide grooves on the optical disc varied, the overlapping areas of the ±first-order diffracted light would hardly affect the beam spot. As a result, the decrease in the detection sensitivity of the tracking error signal can be minimized.

DESCRIPTION OF REFERENCE NUMERALS 1 light source
2 polarizing hologram substrate
2a hologram plane
3 quarter-wave plate
4 collimator lens
5 objective lens
6 optical disc
6a signal plane of optical disc
7 optical axis
8' first-order diffracted light
8" −first-order diffracted light
9 photodetector substrate
9a photodetector plane
10 reflective mirror
16 shielding mask
16a, 16b, 16c, 16d opaque areas

BEST MODE FOR CARRYING OUT THE INVENTION

An optical disc drive according to the present invention includes opaque portions that cut off an incoming light beam partially. These opaque portions cut off particular portions of a light beam that has passed through an objective lens. Those particular portions may be defined on a virtual plane that intersects with the center axis of the objective lens at right angles. Specifically, first, xy coordinates are defined on the virtual plane such that an x-axis is parallel to the radial direction of the optical disc and that a y-axis crosses the x-axis at right angles. If the light beam that has been incident on this virtual plane has a cross section with a radius r, the opaque portions of the present invention function so as to shield the areas that satisfy $|x|>a$ and $|y|>b$ from the incoming light beam, where a and b are positive real numbers and satisfy the inequality $a^2+b^2<r0^2$.

The optical disc drive of the present invention can overcome the problems of the prior art described above by arranging such opaque portions between the objective lens and the light source, for example.

Embodiment

Hereinafter, a preferred embodiment of an optical disc drive according to the present invention will be described with reference to FIGS. 1 through 4.

Look at FIGS. 1(a) and 1(b) first. FIG. 1(a) shows an arrangement for an optical disc drive according to a preferred embodiment of the present invention and FIG. 1(b) shows one side of its light source and surrounding members. The side crosses the paper of FIG. 1(a) at right angles.

In the optical disc drive of this preferred embodiment, a laser beam 1a that has been emitted with a wavelength λ from a light source 1 such as a semiconductor laser diode, which is mounted on a photodetector substrate 9, is reflected by a reflective mirror 10, which is also arranged on the photodetector substrate 9, and then transformed by a collimator lens 4 into a parallel beam, of which the optical axis is defined by the line 7.

The parallel beam, of which the optical axis is defined by the line 7, is transmitted through a polarizing hologram substrate 2 and then transformed by a quarter-wave plate 3 from a linearly polarized light beam (which is either an S-wave or a P-wave) into an elliptically polarized light beam. A portion of this elliptically polarized light beam is cut off by a shielding mask 16 and the rest of the elliptically polarized light beam is condensed by an objective lens 5 with a focal length f to be converged on a signal plane 6a of an optical disc 6.

The light that has been reflected from the signal plane 6a is passed through the objective lens 5, partially cut off by the shielding mask 16, and then transformed by the quarter-wave plate 3 into a linearly polarized light beam (which is either a P-wave or an S-wave) again. This linearly polarized light beam is then incident on the hologram plane 2a of the polarizing hologram substrate 2, diffracted, and then branched into first-order diffracted light 8' and −first-order diffracted light 8", which are symmetric to each other with respect to the optical axis 7 as the axis of symmetry. These branched light beams (diffracted light beams) are converged through the collimator lens 4 and then incident on the detector plane 9a of the photodetector substrate 9. The quarter-wave plate 3 is arranged on the polarizing hologram substrate 2 and moves synchronously with the shielding mask 16 and objective lens 5.

The detector plane 9a is located substantially on the focal plane of the collimator lens 4 (i.e., at the virtual emission point of the light source 1). On the signal plane 6a of the optical disc 6, either guide grooves or pit sequences are arranged at a pitch Λ in the disc radial direction so as to run in the disc rotating direction.

In the space between the light source 1 and the collimator lens 4, the optical axis 7 is aligned with the center axis of the collimator lens 4 and the extension thereof. On the other hand, in the space between the collimator lens 4 and the signal plane 6a of the optical disc 6, the optical axis 7 is aligned with the center axis of the polarizing hologram substrate 2, the center axis of the objective lens 5, and the extensions thereof.

The shielding mask 16 may be formed by coating a transparent substrate with a metal film or a stack of dielectric films and partially patterning it.

Figure 1:
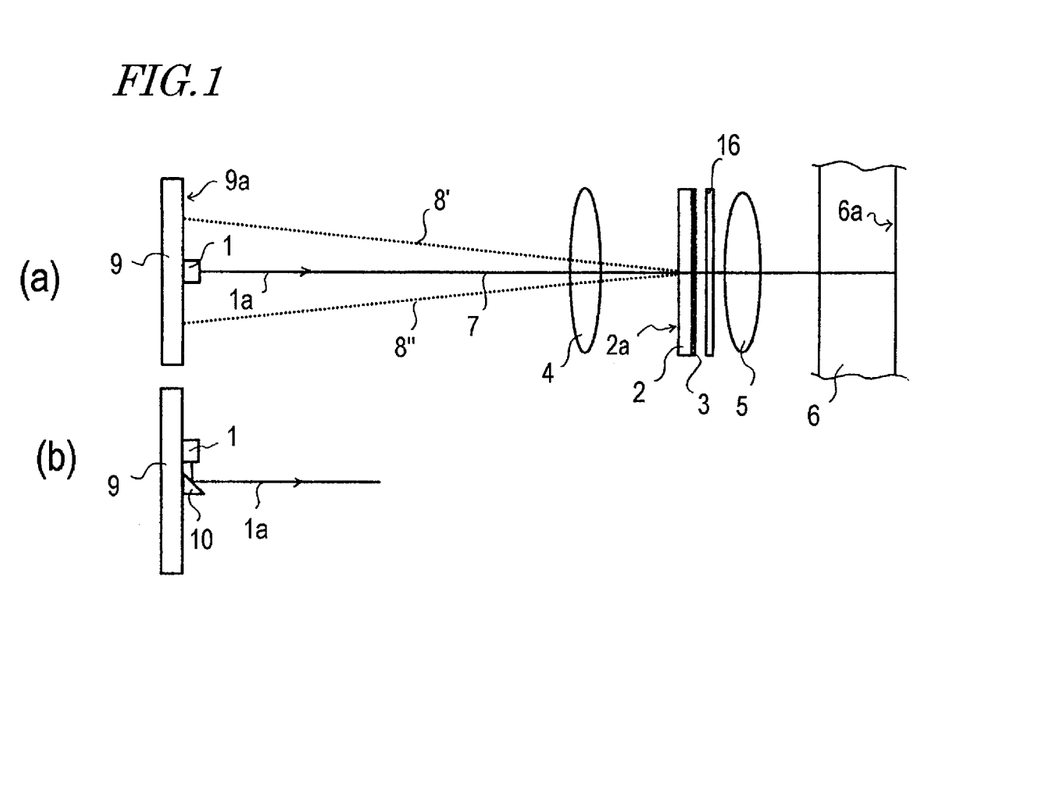
FIG. 1(a) is a cross-sectional view illustrating an arrangement for an optical disc drive according to a preferred embodiment of the present invention and FIG. 1(b) shows one side of its light source and surrounding members, which side crosses the paper of FIG. 1(a) at right angles.
Figure 2:
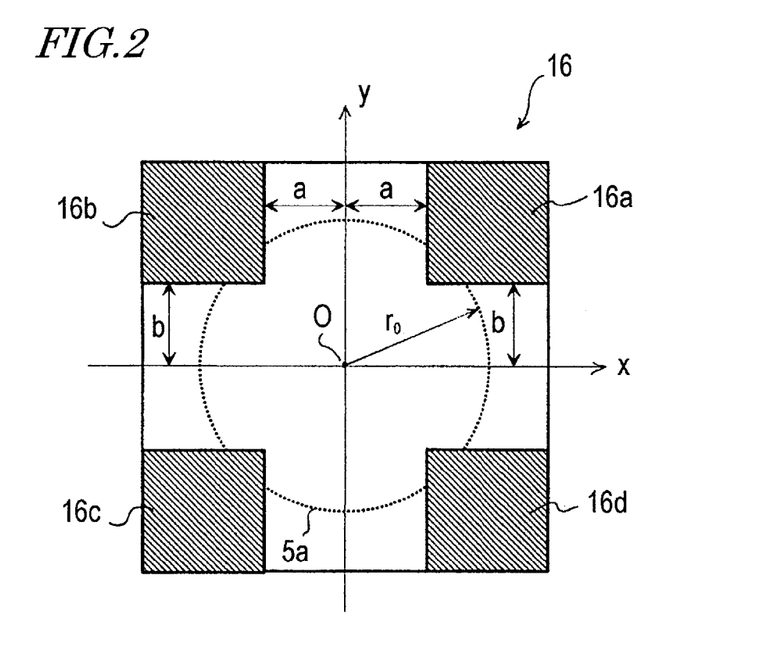
FIG. 2 shows the opaque pattern of a shielding mask 16 for use in that preferred embodiment.

FIG. 2 shows the opaque pattern of the shielding mask 16 for use in this preferred embodiment. The shielding mask 16 does not necessarily have to intersect with the optical axis 7 at right angles but is supposed to do that in the following description.

In FIG. 2, the x- and y-axes correspond to the disc radial direction and rotating direction, respectively, and the point O is the intersection between the optical axis 7 and the surface of the shielding mask. In FIG. 2, the dashed circle indicates the beam spot profile 5a of the light beam that has been incident on the shielding mask 16. More specifically, the beam spot profile 5a is the shape of the light beam that has been reflected from the signal plane 6a of the optical disc 6, transmitted through the objective lens 5, and then incident on the shielding mask 16, and is defined by the aperture radius of the objective lens 5.

The square areas 16a, 16b, 16c and 16d of the shielding mask 16 are opaque areas and are made of either a metal film or a stack of opaque dielectric films. The other area of the shielding mask 16 can transmit light. These opaque areas 16a, 16b, 16c and 16d partially overlap with the beam spot profile 5a. That is why the light beam that has been incident on the shielding mask 16 is partially cut off at the four corners that are located in 45- and 135-degree directions with respect to the point O. The opaque areas of this shielding mask 16 are defined by the following Inequalities (6) using coefficients a and b.

$$|x|>a \text{ and } |y|>b \qquad (6)$$

The coefficient a is approximately a half of the value d given by Equation (1) but is never greater than d/2. The greater the coefficient a, the bigger the aperture area can be. That is why according to Equation (1), it can be seen that the coefficient a preferably falls within the following range.

$$\Lambda/2\lambda - 0.04 < a/f < \Lambda/2\lambda \qquad (7)$$

In ($\Lambda/2\lambda-0.04$) of Equation (7), 0.04 is subtracted as a design margin from the first term ($\Lambda/2\lambda$). This value of 0.04 is a relatively ample value and may be reduced to 0.01 or 0.02 if necessary.

Figure 3:
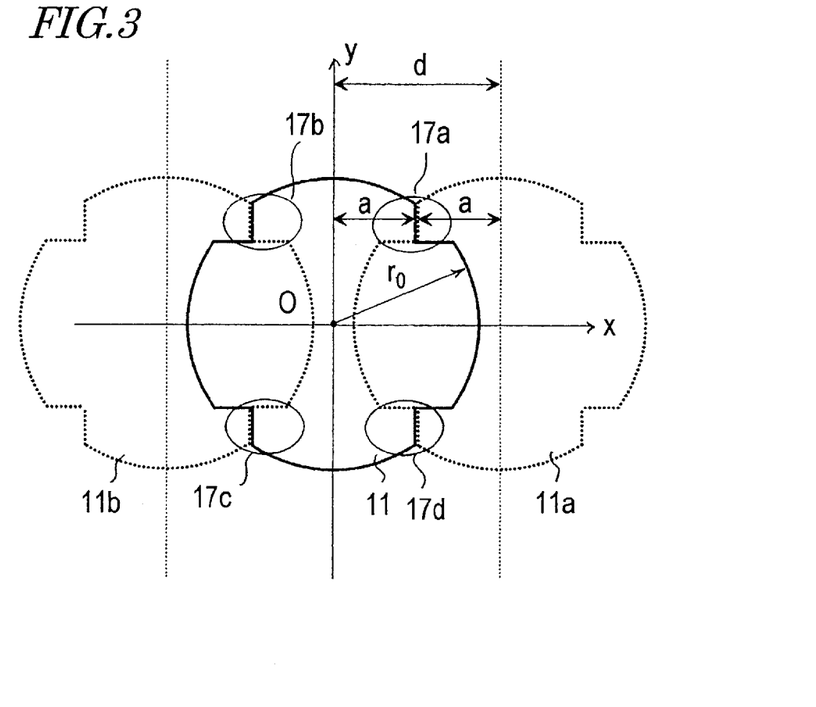
FIG. 3 shows the distribution of reflected light, which is about to enter a hologram plane 2a, in that preferred embodiment.

FIG. 3 shows the distribution of reflected light, which is about to enter the hologram plane 2a, on a plane that intersects with the optical axis 7 of the reflected light at right angles according to this preferred embodiment. In FIG. 3, the x- and y-axes correspond to the disc radial direction and rotating direction, respectively, and the optical axis 7 passes the intersection O between these two axes.

As shown in FIG. 3, diffracted light has been produced in the reflected light by the periodic structure with the pitch $\Lambda$ on the signal plane 6a of the optical disc 6. In the reflected light that is on the verge of entering the hologram plane 2a, first-order diffracted light 11a and −first-order diffracted light 11b overlap with zero-order diffracted light 11. Consequently, in the resultant light distribution, portions of the light outside of the aperture 5a of the objective lens 5 (i.e., where the radius r is greater than r0) and portions of the light blocked by the opaque areas of the shielding mask 16 have been cut off. Since the light beam has already been partially cut off by the shielding mask 16 on the way toward the disc, the zero-order diffracted light 11 has a beam cross section, of which the portions defined by inequalities (6) have been cut off. The ±first-order diffracted light 11a and 11b also have the same beam cross sections but have their centers of diffracted light shifted by d in the disc radial direction (i.e., along the x-axis). Consequently, at the portions indicated by the ellipses 17a, 17b, 17c and 17d, the zero-order diffracted light 11 is never overlapped by the first-order diffracted light 11a or the −first-order diffracted light 11b. As a result, the zero-order diffracted light 11 now accounts for an increased percentage of the beam spot of the reflected light.

Figure 4:
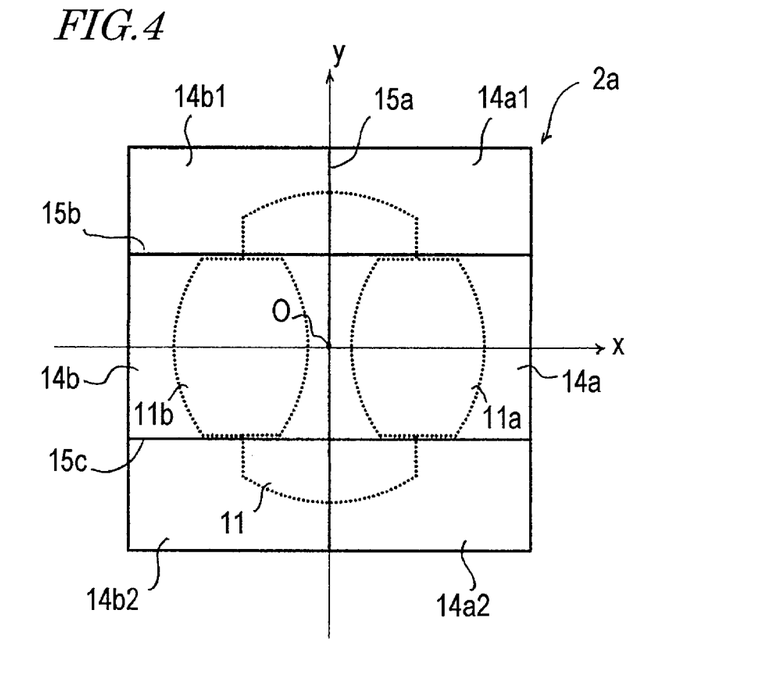
FIG. 4 shows how the light beam spot is divided on the hologram plane 2a in that preferred embodiment.

FIG. 4 shows how the light beam spot is divided on the hologram plane 2a in this preferred embodiment. The hologram plane 2a does not necessarily have to intersect with the optical axis 7 at right angles but is supposed to do that in the following description.

The x- and y-axes correspond to the disc radial direction and rotating direction, respectively, and the optical axis 7 passes the intersection O between these two axes. The hologram plane 2a is divided by division lines 15a, 15b and 15c into six areas 14a, 14a1, 14a2, 14b, 14b1 and 14b2. A portion of the reflected light that has been incident on the hologram plane 2a is branched by these areas, and the intensities of the branched light beams will be detected independently of each other by the photodetectors on the detection plane 9a. The intensities of those light beams detected will be identified by S14a, S14a1, S14a2, S14b, S14b1 and S14b2, respectively. The division line 15a equally splits the zero-order diffracted light 11 into two in the disc rotating direction (i.e., along the y-axis), while the division lines 15b and 15c divide portions of the zero-order diffracted light 11 near the outer periphery in the disc radial direction (i.e., along the x-axis) so as to choose portions that are not overlapped by the ±first-order diffracted light 11a and 11b.

The two signals TE1 and TE2 are figured out by Equations (2) and (3) described above using the detection signals of the photodetectors. In addition, the tracking error signal TE is also generated by Equation (4).

Take a CD as an example. Supposing the wavelength $\lambda$ is 0.80 μm, the pitch $\Lambda$ of the periodic structure on the signal plane 6a of the optical disc 6 is 1.6 μm, and the numerical aperture NA is 0.5, d=r0 (which is the aperture radius of the objective lens 5) is satisfied according to Equation (1). In this case, if the coefficients a and b are defined so as to satisfy a=0.5×r0 and b=0.6×r0, the portions of the reflected light beam spot can have their cross section increased approximately tenfold in the areas 14a1, 14a2, 14b1 and 14b2 contributing to detecting TE2 compared to the first example of the prior art. As a result, the coefficient value k in Equation (4) can be set to be about 3 to about 5. Consequently, the disturbance (such as the distribution fluctuation of the reflected light) on the signal TE2 would affect the TE signal to almost a negligible degree.

In addition, even if the light distribution of the reflected light varied along the x-axis due to the lens shift shown in FIG. 6(b), the distribution fluctuation would cross the division lines much less frequently and would affect TE2 far less significantly because there are few division lines along the y-axis.

Furthermore, even in a situation where the centers of the ±first-order diffracted light have shifted along the x-axis due to a very small variation in the pitch $\Lambda$ of the periodic structure on the signal plane 6a of the optical disc 6, if the coefficient a is decreased below d/2 to provide a greater margin (e.g., if a=d/2−0.02×f), the ±first-order diffracted light never overlap with any of the areas 14a1, 14a2, 14b1 and 14b2 and no off-track information will be included in TE2, either. Consequently, the amplitude (detection sensitivity) about a tracking error represented by the TE signal given by Equation (4) will never attenuate and a tracking error signal can be generated with stability without being affected by the lens shift.

According to this preferred embodiment, as the aperture of the objective lens is partially shielded from incoming light, the optical efficiency decreases to a certain degree. However, the decrease will be no greater than about 5-8% under the conditions described above (i.e., a=0.5×r0 and b=0.6×r0). Also, since the opaque areas are located in 45- and 135-degree directions, not in 0- and 90-degree directions, with respect to the optical axis, the light beam spot will never expand in the 0- and 90-degree directions (which correspond to the radial direction and the rotating direction, respectively) on the signal plane of the optical disc. For that reason, various problems concerning the spot radius, including an increase in crosstalk that could happen depending on the spot size in the radial direction and a decrease in the amplitude of a read signal that can happen depending on the spot size in the rotating direction, will rarely occur.

The optical disc drive of this preferred embodiment includes only one light source. Alternatively, the optical disc drive may include a plurality of light sources that emit light beams with mutually different wavelengths. For example, the optical disc drive may include a light source emitting a light beam with a wavelength of approximately 780 nm for CDs and another light source emitting a light beam with a wavelength of approximately 660 nm for DVDs. In that case, the shielding mask 16 preferably has a mask pattern with wavelength selectivity. That is to say, if the light sources to emit a light beam are changed according to the type of the optical disc that the optical disc drive is now loaded with, the numerical apertures NA of the lens should also be changed according to the wavelength of the light beam. Thus, the aperture radius r0 of the objective lens should change according to the wavelength of the light beam. To provide opaque areas of an appropriate size in such a situation, the shielding mask 16 is preferably formed such that the opaque portions of the shielding mask 16 change their sizes according to the wavelength of the incoming light beam.

For example, the shielding mask 16 may be coated with a stack of dielectric films so as to block an incoming light beam with a wavelength of approximately 780 nm but transmit an incoming light beam with a wavelength of approximately 660 nm. In that case, if the optical disc drive is loaded with a CD, a tracking error signal can be generated with stability without being affected by the lens shift. On the other hand, if the optical disc drive is loaded with a DVD, the light is never cut off both on the way toward, and back from, the disc, and therefore, the light can be used highly efficiently in both ways.

As described above, the shielding mask 16 and the hologram substrate 2 do not have to intersect with the optical axis 7 at right angles. If neither the shielding mask 16 nor the hologram substrate 2 intersects with the optical axis 7 at right angles, then the Inequalities (6) should be satisfied when the shape of the shielding mask 16 is projected perpendicularly to a virtual plane that intersects with the optical axis 7 at right angles. That is to say, the x- and y-axes are defined as coordinates on such a virtual plane.

In the preferred embodiment described above, TE2 is generated based on the intensities at the areas 14a1, 14a2, 14b1 and 14b2. Alternatively, TE2 may also be generated based on either the intensities S14a1 and S14b1 of the light detected at the areas 14a1 and 14b1 or the intensities S14a2 and S14b2 of the light detected at the areas 14a2 and 14b2. In that case, the light intensity represented by the signal TE2 will be halved and the coefficient value k will be doubled. Nonetheless, effects similar to those achieved by the preferred embodiment described above are still achievable.

The shielding mask 16 and the hologram substrate 2 preferably form integral parts of the objective lens 5 but may also be separated from the lens 5.

INDUSTRIAL APPLICABILITY

The optical disc drive of the present invention can generate a tracking error signal with stability without being easily affected by a distribution fluctuation in the light reflected from the optical disc or a lens shift, and therefore, can be used in various types of data recorders and audiovisual equipment.

The invention claimed is:

1. An optical disc drive for reading and/or writing data from/on an optical disc, the drive comprising:
   a light source for emitting a light beam;
   an objective lens for converging the light beam, the lens having an aperture radius r0;
   an optical branching element for dividing the light beam that has been reflected from the optical disc into multiple branched light beams;
   a photodetector, on which at least some of the branched light beams are incident and which generates signals representing the intensities of the respective incident branched light beams; and
   opaque portions for cutting off the light beam partially,
   wherein if xy coordinates are defined on a virtual plane, which intersects with the center axis of the objective lens at right angles, such that an x-axis is parallel to a radial direction of the optical disc and that a y-axis crosses the x-axis at right angles, the opaque portions prevent the light beam from passing through areas of the virtual plane that are defined by coordinates (x, y) satisfying $|x|>a$, $|y|>b$ and $a^2+b^2<r0^2$ (where a and b are positive real numbers).

2. The optical disc drive of claim 1, wherein the positive real number a satisfies the inequality $\Lambda/2\lambda - 0.04 < a/f < \Lambda/2\lambda$, where $\lambda$ is the wavelength of the light beam that has been emitted from the light source, f is the focal length of the objective lens and $\Lambda$ is a pitch of a guide groove and a pit sequence of the optical disc.

3. The optical disc drive of claim 1, wherein the optical branching element branches the light beam into a light beam that is going to enter an area of the virtual plane where $y > b$ and $x > 0$ are satisfied and a light beam that is going to enter another area of the virtual plane where $y > b$ and $x < 0$ are satisfied, and uses a signal representing a difference in light intensity between these two light beams that have been incident on the respective areas to correct a tracking error signal.

4. The optical disc drive of claim 1, wherein the optical branching element branches the light beam into a light beam that is going to enter an area of the virtual plane where $y < -b$ and $x > 0$ are satisfied and a light beam that is going to enter another area of the virtual plane where $y < -b$ and $x < 0$ are satisfied, and uses a signal representing a difference in light intensity between these two light beams that have been incident on the respective areas to correct a tracking error signal.

5. The optical disc drive of claim 3, wherein the optical branching element branches the light beam into a light beam that is going to enter an area of the virtual plane where $|y|<b$ and $x > 0$ are satisfied and a light beam that is going to enter another area of the virtual plane where $|y|<b$ and $x < 0$ are satisfied, and
   wherein supposing a signal representing a difference in light intensity between these two light beams that have been incident on the respective areas is TE1 and a signal representing a difference in light intensity between two light beams that have been incident on an area where $y > b$ and $x > 0$ are satisfied and on an area where $y > b$ and $x < 0$ are satisfied, respectively, is TE2, a tracking error signal, given by the equation TE1−k×TE2 (where k is a constant), is generated.

6. The optical disc drive of claim 4, wherein the optical branching element branches the light beam into a light beam that is going to enter an area of the virtual plane where $|y|<b$ and $x > 0$ are satisfied and a light beam that is going to enter another area of the virtual plane where $|y|<b$ and $x < 0$ are satisfied, and
   wherein supposing a signal representing a difference in light intensity between these two light beams that have been incident on the respective areas is TE1 and a signal representing a difference in light intensity between two light beams that have been incident on an area where $y < -b$ and $x > 0$ are satisfied and on an area where $y < -b$ and $x < 0$ are satisfied, respectively, is TE2, a tracking error signal, given by the equation TE1−k×TE2 (where k is a constant), is generated.

7. The optical disc drive of claim 1, wherein the optical branching element branches the light beam into a light beam that is going to enter an area of the virtual plane where |y|>b and x >0 are satisfied and a light beam that is going to enter another area of the virtual plane where |y|>b and x <0 are satisfied, and uses a signal representing a difference in light intensity between these two light beams that have been incident on the respective areas to correct a tracking error signal.

8. The optical disc drive of claim 5, wherein the optical branching element branches the light beam into a light beam that is going to enter an area of the virtual plane where |y|<b and x >0 are satisfied and a light beam that is going to enter another area of the virtual plane where |y|<b and x <0 are satisfied, and wherein supposing a signal representing a difference in light intensity between these two light beams that have been incident on the respective areas is TE1 and a signal representing a difference in light intensity between two light beams that have been incident on an area where |y|>b and x >0 are satisfied and on an area where |y|>b and x <0 are satisfied, respectively, is TE2, a tracking error signal, given by the equation TE1−k×TE2 (where k is a constant), is generated.

9. The optical disc drive of claim 2, wherein the optical branching element branches the light beam into a light beam that is going to enter an area of the virtual plane where y >b and x >0 are satisfied and a light beam that is going to enter another area of the virtual plane where y >b and x <0 are satisfied, and uses a signal representing a difference in light intensity between these two light beams that have been incident on the respective areas to correct a tracking error signal.

10. . The optical disc drive of claim 2, wherein the optical branching element branches the light beam into a light beam that is going to enter an area of the virtual plane where y <−b and x >0 are satisfied and a light beam that is going to enter another area of the virtual plane where y <−b and x <0 are satisfied, and uses a signal representing a difference in light intensity between these two light beams that have been incident on the respective areas to correct a tracking error signal.

11. The optical disc drive of claim 2, wherein the optical branching element branches the light beam into a light beam that is going to enter an area of the virtual plane where |y|>b and x >0 are satisfied and a light beam that is going to enter another area of the virtual plane where |y|>b and x <0 are satisfied, and uses a signal representing a difference in light intensity between these two light beams that have been incident on the respective areas to correct a tracking error signal.

* * * * *